US006269345B1

United States Patent
Riboud

(10) Patent No.: US 6,269,345 B1
(45) Date of Patent: Jul. 31, 2001

(54) TRANSFER SYSTEM AND METHOD FOR TRANSFERRING AMOUNTS IN DIFFERENT LOCAL CURRENCIES BETWEEN A PLURALITY OF LOCAL BANKING ORGANIZATION

(76) Inventor: Jacques Riboud, 14, avenue Georges Mandel, 75116 Paris (FR)

( * ) Notice: Subject to any disclaimer, the term of this patent is extended or adjusted under 35 U.S.C. 154(b) by 0 days.

(21) Appl. No.: 08/982,407

(22) Filed: Dec. 2, 1997

(30) Foreign Application Priority Data

Dec. 3, 1996 (FR) .................................................. 96 14913

(51) Int. Cl.[7] .................................................. G06F 17/60
(52) U.S. Cl. ............................... 705/35; 705/37; 705/39; 706/925; 380/24; 380/25
(58) Field of Search .................................. 705/35, 37, 39; 706/925; 380/24, 25

(56) References Cited

U.S. PATENT DOCUMENTS

| 4,319,130 | * | 3/1982 | Spitzner ................................. 341/75 |
| 5,761,386 | * | 2/2000 | Lawrence et al. ...................... 706/20 |
| 5,774,553 | * | 6/1998 | Rosen ..................................... 380/49 |
| 5,787,402 | * | 7/1998 | Potter et al. ........................... 705/37 |
| 5,806,050 | * | 9/1998 | Shinn et al. ........................... 705/37 |
| 5,852,812 | * | 12/1998 | Reeder ................................... 705/39 |
| 5,890,140 | * | 3/1999 | Clark et al. ........................... 705/35 |
| 5,897,621 | * | 4/1999 | Boesch et al. ........................ 705/26 |
| 5,978,485 | * | 11/1999 | Rosen ..................................... 705/39 |
| 6,023,708 | * | 2/2000 | Lawrence et al. ...................... 706/20 |

FOREIGN PATENT DOCUMENTS

| 435182 | | 7/1991 | (EP) . |
| 0 542 298 A2 | * | 5/1993 | (EP) . |
| 542298 | | 5/1993 | (EP) . |
| 590 861 A2 | * | 4/1994 | (EP) . |
| 0 421 808 A2 | * | 4/1991 | (WO) . |
| WO 97/43727 | * | 4/1991 | (WO) . |
| WO 91/16691 | * | 10/1991 | (WO) . |
| WO 95/12169 | * | 5/1995 | (WO) . |

OTHER PUBLICATIONS

"RSA Signs Deal With China", Internet Week, vol. 2, No. 7, Feb. 12, 1996.*
Cohen, Jackie, "Citibank's Bid To Be The King of Cash", Bank Technology News, vol. 9, No. 9, pp. 9–12, Sep. 1996.*
"PSINet Teams With WorldPay Ltd. to Launch the World's First Secure Multi–Currency Solution to International Electronic Commence", PR Newswire, Oct. 6, 1997.*
McDougall, Bruce, "Electronic Evolution", Canadian Banker, vol. 102, No. 5, pp. 28–33, Sep.–Oct. 1995.*
Bers, Joanna Smith, "Cyberspace: The New Promised Land", Bank Systems and Technology, vol. 32, No. 7, pp. 32–37, Feb. 12, 1996.*

* cited by examiner

Primary Examiner—Eric W. Stamber
Assistant Examiner—Akiba Robinson-Boyce
(74) Attorney, Agent, or Firm—William A. Drucker

(57) ABSTRACT

To transfer a quantity measured in a first unit used by a first entity to a second entity using a second unit, these units being associated with a respective parameter varying as a function of time, the system according to the invention comprises: a means for determining a first operation taking into account variations in the parameter associated with the first unit, in order to convert the latter into a reference unit associated with a constant parameter; a means for applying the first operation to the quantity to be transferred, and for sending the converted quantity to the second system; a means for determining a second operation for converting the reference unit into the second unit, taking into account the variations of the parameter associated with said second unit; and a means for applying the second operation to the quantity in reference units and for transferring the quantity converted in the second system.

17 Claims, 3 Drawing Sheets

TRANSFER SYSTEM AND METHOD FOR TRANSFERRING AMOUNTS IN DIFFERENT LOCAL CURRENCIES BETWEEN A PLURALITY OF LOCAL BANKING ORGANIZATION

BACKGROUND OF THE INVENTION

Field of the Invention

This invention relates to a system for exchanging, between several entities, quantities which are expressed in different units of measurement but convertible to and from one another, each of these units being associated with a parameter varying randomly as a function of time.

It applies notably, though not exclusively, to international exchanges of goods and services which are usually carried out using a counterpart value expressed in one or more currencies, and, in certain cases, using the currency of one state as reference currency. However, it so happens that, on the one hand, the real value (in terms of purchasing power) of the currencies of all states, without any exceptions, are subjected to variations occurring more or less suddenly, and, on the other hand, currency exchange rates undergo unforeseeable fluctuations that can entail considerable losses in the case of international transactions. These variations are brought about by a large number of factors, particularly the economic strength of the state in which the currency is issued, the quantity of money issued and currency speculation.

Indeed, it is crucial that the prices, in real value, demanded and paid for goods and services exchanged between states be set over a period of sufficient duration. This is not the case due to the fact that national currency exchange rates rise and fall, in a chronically feverish manner, and which most often do not therefore reflect the true relative positions, either at the time or at which they can be estimated at some point in the future, of the states in which these currencies are issued.

Furthermore, with the current monetary system, the exchange rates between currencies cannot be stabilized. In fact, when a currency is artificially driven downward in relation to other currencies as a result of speculation, the only means of countering this speculation, in order to stabilize the exchange rate in relation to the other national currencies, consists in exchanging said currency for a corresponding quantity of a stronger currency issued for this purpose. However, this operation has the effect of increasing the supply of money in circulation in the case of the stronger currency, and therefore of increasing inflation in the market of the country that issued said currency.

OBJECT OF THE INVENTION

The main object of this invention is to remedy the preceding disadvantages, particularly to provide a transfer system that can be used to regulate monetary flows in international transactions, this system enabling the transfer of quantities, measured in different local units of measurement, between a plurality of entities, each entity using a local unit of measurement of its own associated with at least one parameter varying randomly as a function of time.

SUMMARY OF THE INVENTION

According to the invention, each entity is associated with a respective peripheral computer connected to a central computer by means of a transmission network, each peripheral computer comprising:

a means for determining a first conversion operation to convert the local unit of measurement, used by the associated entity, into a predetermined reference unit, and a second conversion operation for reciprocally converting the reference unit into the local unit of measurement used by the associated entity, the reference unit being associated with a parameter of constant real value, and these conversion operations taking into account previous variations of the parameter associated with the local unit of measurement, a first transfer means for transferring, to another entity, quantities measured in the local unit used by the entity, this means applying the first conversion operation to the quantity to be transferred so as to obtain the equivalent quantity in reference units, and transferring this quantity along with the indication specifying the entity for which said quantity is destined, via the transmission network to the central computer, and a second transfer means for transferring, from the central computer, quantities expressed in reference units, this means applying the second conversion operation to these quantities in order to obtain the equivalent quantity in the local units used by the associated entity, and transferring said equivalent quantity in local units to the associated entity via the transmission network, the central computer comprising a means for receiving and storing the quantities in reference units transferred by the peripheral computers of the entities, and for transmitting quantities expressed in reference units to the peripheral computers.

When the system according to the invention is applied to international commercial transactions, the local units correspond to national currencies, whereas the reference unit corresponds to a reference currency created to be stable, in terms of purchasing power, in one of the states whose national currency has been selected as a basis for conversion with the reference currency. Thus, funds converted into the reference currency retain their value once the first conversion into the reference unit or currency has been performed, and up until the second conversion operation. This prevents variances in real value generated by the conversions between national currencies whose variations in real value (purchasing power) and exchange rate variations are not systemically related.

Advantageously, the quantities measured in reference units are only used for the transfer of quantities between the systems, whereas the quantities expressed in local units can be exchanged within the entities. Thus, when the system according to the invention is applied to currencies, the reference unit or currency is not used for local transactions within a state, but solely for international transactions; it is therefore not exposed to the causes entailing depreciation of local or national currencies, i.e. local money supply circulating within a state, production, consumption, wages or import prices.

The respective conversion rates of the local units vary as a function of the quantities of local units circulated respectively by the different entities. Thus, when the parameter associated with a local unit of an entity depreciates abnormally in relation to those associated with the other local units, the system according to the invention can further comprise a means for triggering the first transfer means, with the first entity as destination, applied to a certain quantity measured in this local unit, which has the effect of withdrawing this quantity in local units from the first entity, of applying the first conversion operation thereto, and of transferring in exchange the equivalent quantity expressed in reference units, from the central computer to the peripheral computer of this unit.

Conversely, when the parameter associated with the local unit of an entity exceeds an upper threshold in relation to the parameters associated with the other local units, the system according to the invention comprises a means for triggering the second transfer means applied to a certain quantity of reference units towards this entity, which has the effect of applying the second conversion operation to the quantity expressed in reference units, and of transferring in exchange the equivalent quantity expressed in the local units of this entity, from the central computer to the peripheral computer of this entity.

When applied to currencies, the available money supply of the reference currency not being limited, it can be created or suppressed according to requirements in order to automatically regulate the respective values of the other currencies. The system according to the invention is thus capable of stabilizing the rates at which the national currencies are exchanged, thus enabling panic to be overcome and speculation to be deterred.

According to another feature of the invention, the second conversion operation uses a conversion factor which increases with time. In this way, quantities in local units and converted into reference units have a value that varies in time but that can be compared by means of the reference unit.

BRIEF DESCRIPTION OF THE DRAWINGS

Further features and advantages of the invention will be apparent from an embodiment of the system according to the invention described, by way of a non-limiting example, in reference to the corresponding accompanying drawings in which.

DESCRIPTION OF THE PREFERRED EMBODIMENTS

Figure 1:
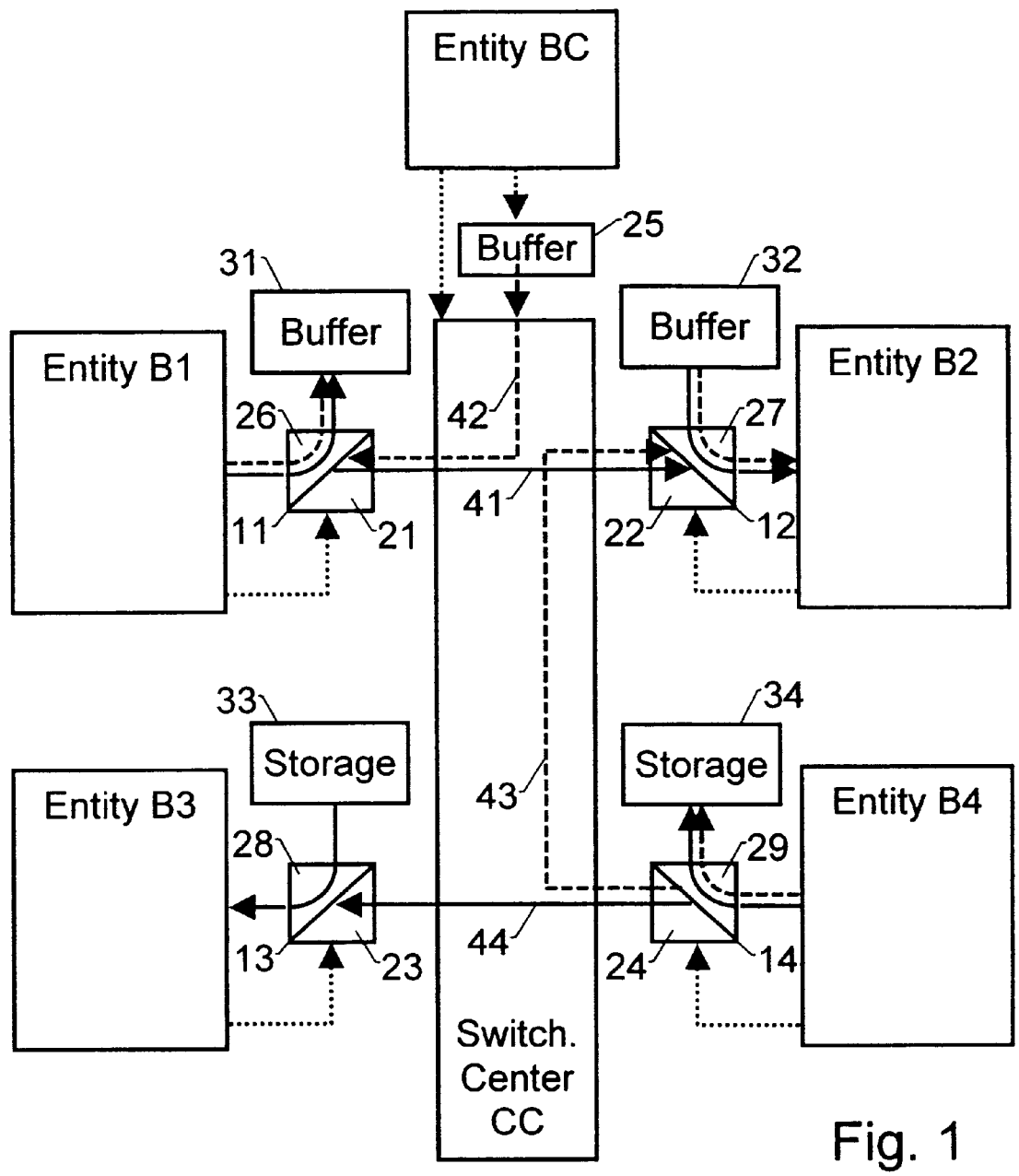
FIG. 1 schematically represents the mechanisms used by the system according to the invention.

FIG. 1 schematically represents a plurality of entities B1, B2, B3, B4 which issue quantities measured in respective local units of measurement, these quantities being usable within each entity and convertible to the other local units of measurement.

The local units of measurement have the particularity of being associated with respective parameters whose value fluctuates randomly as a function of time.

The different entities B1 to B4 will be exchanging quantities measured in their respective local units. To this end, they are all connected to a same switching center CC, via a respective conversion mechanism 11 to 14 that they control. Each conversion mechanism 11 to 14 comprises a temporary storage zone or buffer memory 21 to 24 coupled to the conversion mechanism proper 26 to 29.

When, for instance, entity B1 triggers a transfer of a quantity X1, measured in the local unit UL1 of entity B1, to entity B2, this quantity is firstly processed by the conversion mechanism 11 which transfers it to a storage zone 31 storing quantities issued by entity B1, and which generates an equivalent quantity Xr measured in a reference unit UR, of constant value, which is applied to the input of the buffer memory 21 associated with an identifier of the destination entity, in this instance B2. The switching center CC which receives the order to transfer the quantity Xr to entity B2, immediately removes the quantity Xr from the buffer memory 21 in order to transfer it (arrow 41) to the buffer memory 22 connected to entity B2. This quantity Xr can then be used by entity B2 to carry out other transfers with the other entities, or can be completely or partly converted to the local unit UL2 of entity B2. In the latter case, entity B2 triggers the associated conversion mechanism 12 which removes, from the buffer memory 22, the ordered quantity expressed in reference units, and transfers an equivalent quantity X2 measured in the local unit UL2 from the storage zone 32 to entity B2.

It should be noted that, during the process of transferring the X1 local units UL1 to entity B2, no loss occurs thanks to the stable value of the reference unit UR even if the conversion into local units UL2 of the transferred quantity Xr is not performed immediately after the transfer.

The switching center CC performs real-time processing of all transfers in reference units UR between all the entities B1 to B4, e.g. as represented in FIG. 1, between B4 and B2 (arrow 43) and between B4 and B3 (arrow 44). In this manner, it immediately compensates the input and output movements in B1 to B4, thus determining a balance for each unit expressing the position of the latter in relation to CC.

The switching center CC only carries out the transfers between the buffer memories 21 to 24 when these transfers do not cause the minimum and maximum thresholds associated with each buffer memory 21 to 24 to be exceeded.

When a transfer is not carried out because it would entail a threshold being exceeded, the switching center CC notifies the entity at the source of the transfer, which must take appropriate measures for this transfer to become feasible.

The switching center CC is controlled by a control system BC which monitors the thresholds applied to each buffer memory 21 to 24. The control system BC can thus control the quantity of reference units put into circulation.

The control system BC further comprises an automated regulation mechanism which monitors and performs real-time regulation of the conversion rates between the different local units UL, and when a conversion rate of a local unit is on an abnormally downward trend (e.g. if the rate in question exceeds a certain predetermined low threshold), this mechanism steps in by triggering the transfer (arrow 42) of a certain quantity Xr' of reference units UR from the buffer memory 25 associated therewith to the buffer memory associated with the entity whose local unit is on a downward trend (B1 in the example in FIG. 1), which has the effect of transferring, at the level of the conversion mechanism 11, an equivalent quantity measured in local units UL1, from entity B1 to the storage zone 31, and therefore of withdrawing this quantity from circulation within entity B1. This operation can be repeated until the desired effect is obtained on the conversion rate in question.

Conversely, when the conversion rate of a local unit UL1 exceeds a certain predetermined upper threshold, this mechanism triggers the transfer, from the corresponding buffer memory 21, of a quantity Xr" of reference units UR to the buffer memory 25, which has the effect, at the conversion mechanism 11 level, of transferring an equivalent quantity in local units UL1 from the storage zone 31 to the 30 entity B1.

According to another feature of the invention, the absolute value of the quantities stored in the storage zones 31 to 34 and in the buffer memories increases as a function of time at predetermined rates in order to constitute regulation reserves.

The system according to the invention applies e.g. to international monetary transfer mechanisms. Thus, in FIG. 1, each entity corresponds to a bank, the switching center CC to an interbank clearing center, and the local units UL correspond to the national currencies of the states in which the banks are situated.

When a transfer order is placed with bank B1 for an amount X1 in currency UL1, from an account C1$i$ managed by this bank to an account C2$j$ managed by bank B2, this amount X1 is debited from the account C1$i$ and credited to the account 31 by means of the conversion mechanism 11 which creates the equivalent quantity Xr in the reference currency UR (FIG. 1). The conversion mechanism 11 then transmits, to the clearing center CC, a transfer order for the amount Xr in the reference currency to the account 22 for the account C2$j$ managed by the bank B2.

The holder of account C2$j$ is then notified that he has been credited with the amount Xr in the reference currency, that he can either use in the state where bank B2 is situated after converting it into the national currency UL2, or transfer to another account for another international transaction. In the first case, the conversion mechanism 12 represented in FIG. 1 debits the amount Xr from the account 22, and transfers the corresponding amount X2 in local unit UL2 from the account 32 to the account C2$j$ managed by the bank B2.

The central bank BC notably has the role of regulating exchange rates between the different national currencies of the states, on the one hand by absorbing excessive selling of a weak currency, which it can do by transferring surplus amounts in the corresponding accounts 31 to 34, in exchange for the equivalent amount in the reference currency it creates, and, on the other hand, by putting back into circulation in the corresponding states, the amounts lacking from the corresponding accounts 31 to 34, by destruction of equivalent amounts in the reference currency.

The rate of conversion to the reference currency UR is e.g. determined from a local currency selected to serve as base local currency for the reference currency (e.g. the local currency UL1 used in the country of origin of bank B1), and an index of current variation Id1 of the value of said local currency UL1, where this index can be chosen equal to the index of inflation in the country using the base local currency UL1.

Thus, to find the value Xr in reference currency of the amount X1 expressed in local currency UL1 used as base local currency, the following formula applies:

$$Xr = X1 \times Id1. \tag{1}$$

Should an amount X3 expressed in the local currency UL3 used in the country of origin of bank B3 need to be converted into the reference currency UR, it would be sufficient to use the rate of exchange T31 of local currency UL3 into local currency UL1, by applying the following formula:

$$Xr = X3 \times T31 \times Id1 \tag{2}$$

As the values of the amounts in local currency vary randomly as a function of time, this variation is not known beforehand but is appraised approximately on the basis of the inflation indexes known for previous periods. Thus, for instance, a daily inflation index Id is computed by extrapolation by means of the following formula:

$$Id = Id_m + j \times Id_j \tag{3}$$

$Id_m$ being the last known index of inflation, j being the number of days lapsed since the end of the period of evaluation of the index $Id_m$, and $Id_j$ being the daily growth rate of the index. This rate can be e.g. evaluated from the average rate of inflation of the index over three months, as follows:

$$Id_j = \frac{Id_m - Id_{m-3}}{Nbj} \tag{4}$$

$Id_{m-3}$ being the index of inflation determined three months previously, and Nbj being the number of days in a three-month period. Thus, Nbj can be chosen equal to 90.

The central bank BC fixes an interest rate to be applied to the values of the different accounts 21 to 25 and 31 to 34, the computer in the clearing center CC reappraising, for each unit of time, the respective positions of the accounts 21 to 24 according to this rate of interest.

Figure 2:
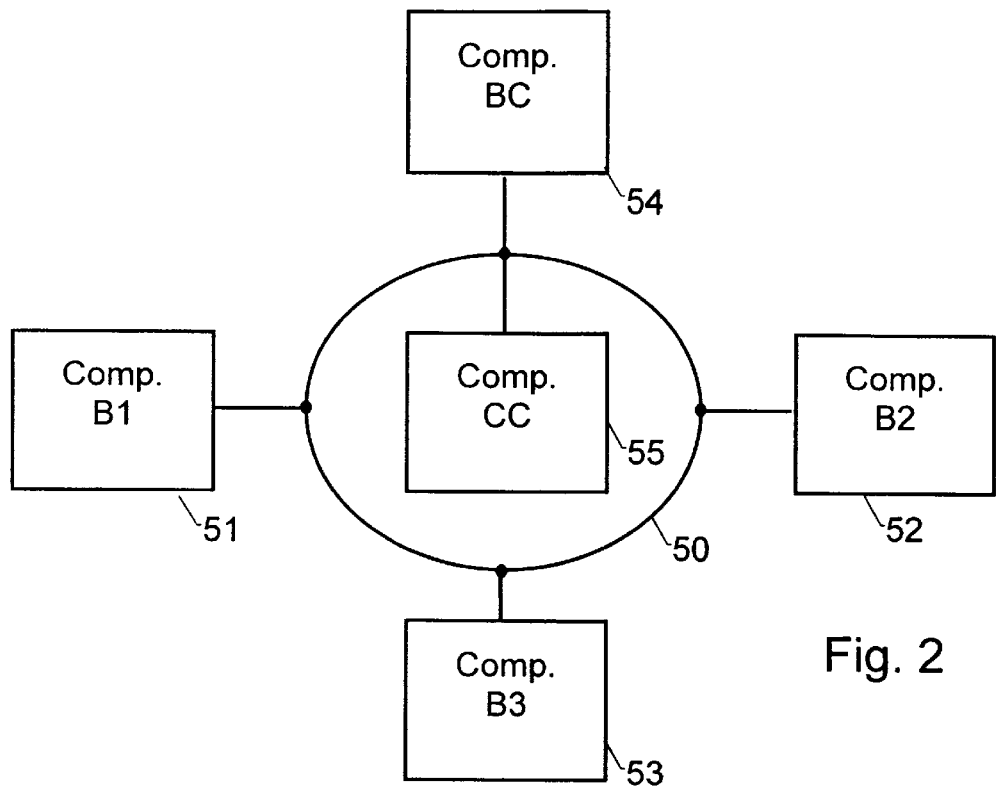
FIG. 2 represents a system according to the invention comprising peripheral computers and a central computer connected to one another in a network.

In FIG. 2, these mechanisms are advantageously used by computers 51 to 55, or computer systems interconnected by internal networks, respectively equipping the banks B1 to B3, as well as the central bank BC and the clearing center CC. These systems are interconnected by a protected telecommunications network 50 in order to be capable of performing the transmission, reception and real-time processing of the different transfer orders they exchange, while ensuring that these orders are irrevocable.

Figure 3:
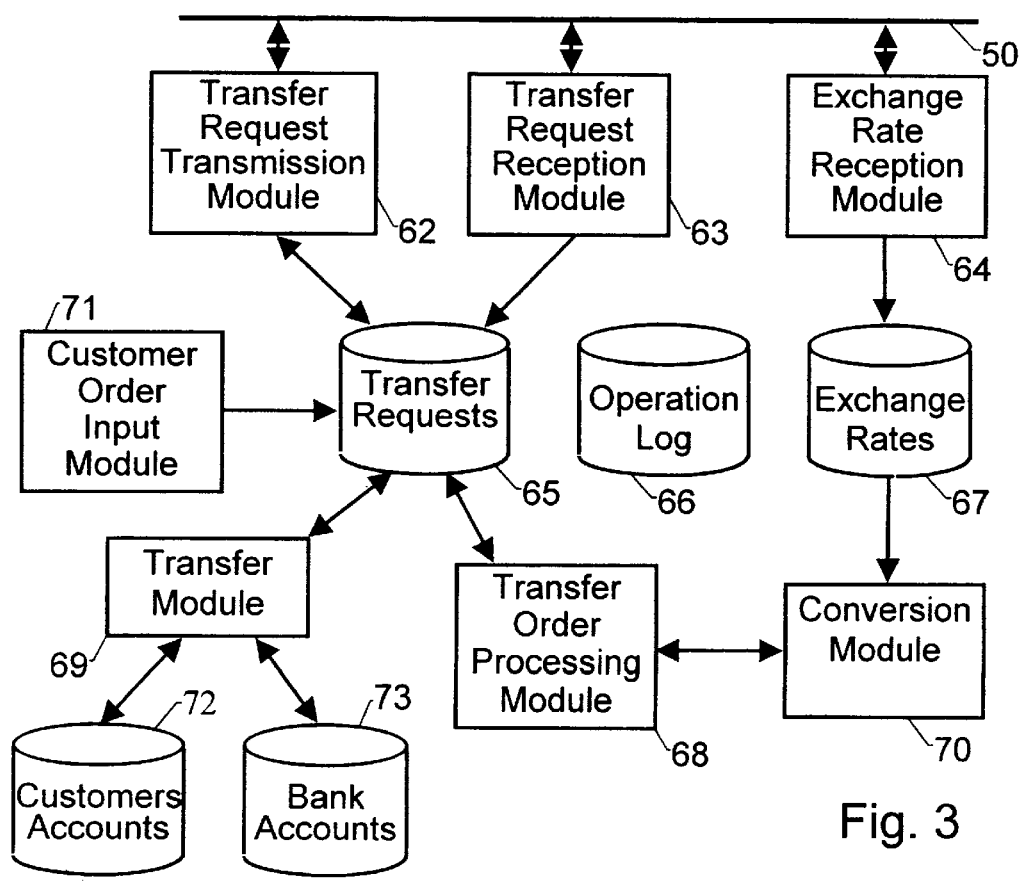
FIG. 3 illustrates, in the form of a block diagram, the processing performed by each peripheral system represented in FIG. 3.

In FIG. 3, the computers or systems 51 to 54 each comprise a module 71 for introducing orders to transfer a certain amount to an account situated in a region using another local currency, these orders coming from the customers of the corresponding bank B1 to B3. When this module is activated, it triggers e.g. the display on a screen of a data entry form to enable the operator to enter the following information:

the account number of the person issuing the transfer order, the account number of the beneficiary of the order, the amount of the transfer, the currency in which the transfer amount is expressed, the currency into which the transfer amount is to be exchanged, and the direction of transfer.

The account numbers include a bank identification number and the number of the account attributed by the bank to the customer.

The module 71 checks that all the information required to perform a transfer has been entered and is correct, formats this information and transfers it to a transfer request file 65.

This file 65 advantageously contains, for each request to be processed, the information entered by the operator, as well as a field destined to receive the value of the amount to be transferred in the reference currency, and a field receiving a code specifying the status of the request, particularly the processing already performed on this request, and whether the request has been accepted or rejected.

The inclusion of a request in the file 65 activates an order transfer processing module 68 which reads the amount to be transferred and sends this amount to a conversion module 70 in order to obtain the equivalent amount in the reference currency. To this end, the module 70 has access to a file 67 containing the values of the exchange rates, which enables it to apply formula (1) or formula (2) according to whether or not the local currency is the currency used as base currency for the reference currency. The file 67 is updated in real time by a module 64 receiving the exchange rates which are e.g. transmitted periodically by the computer 54.

Once it has obtained the value in reference currency of the amount to be transferred, the module 68 includes this value in the recording of the request stored in the file 65.

The request recordings stored in the file 65 thus completed are then processed by a request transmission module 62 which sends the request information stored in this file, via the network 50, to the computer 55 of the clearing center CC. This computer 55 then determines whether or not the requested transfer is authorized and returns to the transmitting computer 51 to 54 the recording of the request completed by an authorization code.

Each computer of system 51 to 54 also includes a reception module 63 which receives the recordings of transfer request by the other computers 51 to 55. In the case of a request returned by the computer 55 in the clearing center CC, the module 63 completes—in the file 65—the recording of the request received, by inclusion in said file 65 of the authorization code returned by the clearing center CC. In all other cases, the requests will be requests issued by other banks and the recording received is then added to the file 65.

When a transfer request is rejected by the computer 55 in the clearing center CC, the computer 51 to 54 advises the bank's operator who must then take the necessary measures with the central bank BC to have this transfer authorized. Once these measures have been taken, the operator can update the recording of the rejected request so as to take out the authorization code and thus trigger transmission thereof by the module 62 to the computer 55, in order to renew the transfer authorization request to the clearing center CC.

When an authorized request is recorded in the file 65, a transfer module 69 is activated. This module has access to a customer accounts file 72 and to a file 73 of the bank's accounts so as to perform the transfer proper indicated in the recording of the authorized request. This transfer is carried out by debiting the amount in local currency from the customer account, and by crediting this amount in the same currency to the bank's account. This module updates the corresponding request recording in the file 65 to indicate that the transfer has been performed.

When such a transfer has been carried out, the module 62 transfers the recording of the request to the computer of the bank of the beneficiary to which the transfer is addressed, in order to advise the latter that the beneficiary has received a certain amount in the reference currency.

When the module 63 receives a recording of a transfer request performed in favor of a customer of the bank, it inscribes it in the file 65, thereby triggering the module 69 again which debits a bank's account in reference currency in the file 73 by the amount indicated in the recording of the request, and credits this amount in reference currency to the account of the customer to whom the transfer is addressed.

This module 71 can also receive exchange orders from bank customers, to exchange a certain amount expressed in the reference currency into the local currency, or vice versa. In this case, the module 71 makes a transfer request recording in which the account numbers of the issuer and beneficiary are identical, this recording being included in the transfer requests file 65. This recording will then be processed by the module 68, then directly by the module 69, as there is then no need to request an authorization from the computer 55 in the clearing center CC.

All the operations performed in the file 65 are memorized in a log 66, as they occur, by modules 62, 63, 68, 69 and 71.

Figure 4:
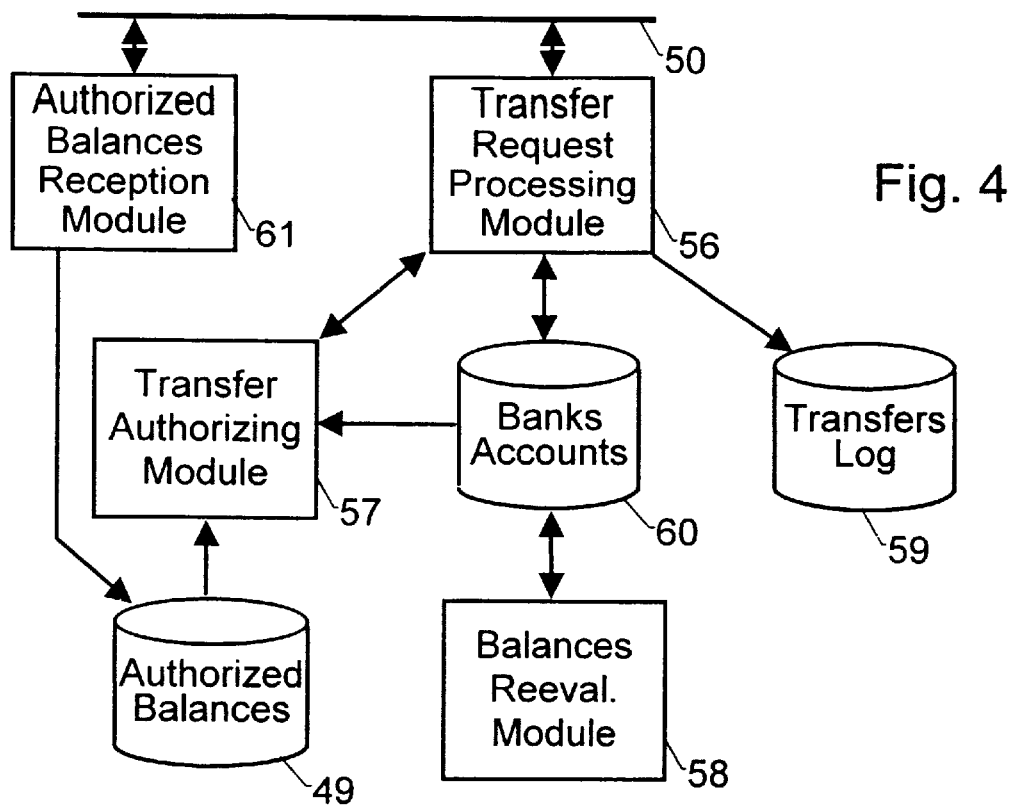
FIG. 4 illustrates, in the form of a block diagram, the processing performed by the central computer represented in FIG. 2.

In FIG. 4, the computer 55 in the clearing center CC comprises a module 56 for processing the recordings of transfer requests issued by the computers 51 to 54, which transmits the recordings received to a transfer authorization module 57. A file 60 managed by the computer 55 memorizes the balances of transfers in reference currency carried out between the banks B1 to B4. The module 57 has access to the balances file 60 and to a file 49 of authorized balance thresholds in positive and negative values, so as to check that the amount to be transferred does not entail these threshold values being exceeded by the bank issuing the transfer and the bank to which the transfer is addressed. The module 57 returns, to the module 56, the recording of the request completed by the authorization code which sends it to the computer 51 to 54 of the bank that issued the request. If the request is authorized, the processing module 56 updates the balances file 60 by debiting the transfer amount in the reference currency from the issuing bank's account, and by crediting this amount in the same currency to the balance of the bank to which the transfer is addressed.

The computer 55 further comprises a transfer log file 59 in which are memorized the transfer operations performed by the computer 55 in the balances file 60.

It also comprises a module 61 for receiving threshold values, which updates the file 49 at the request of the banks B1 to B3 and BC, and a balances re-evaluation module 58 which periodically updates the bank balances recorded in the file 60 by application thereto of a predefined rate of interest, e.g. provided by the computer 54 of the central bank BC.

Figure 5:
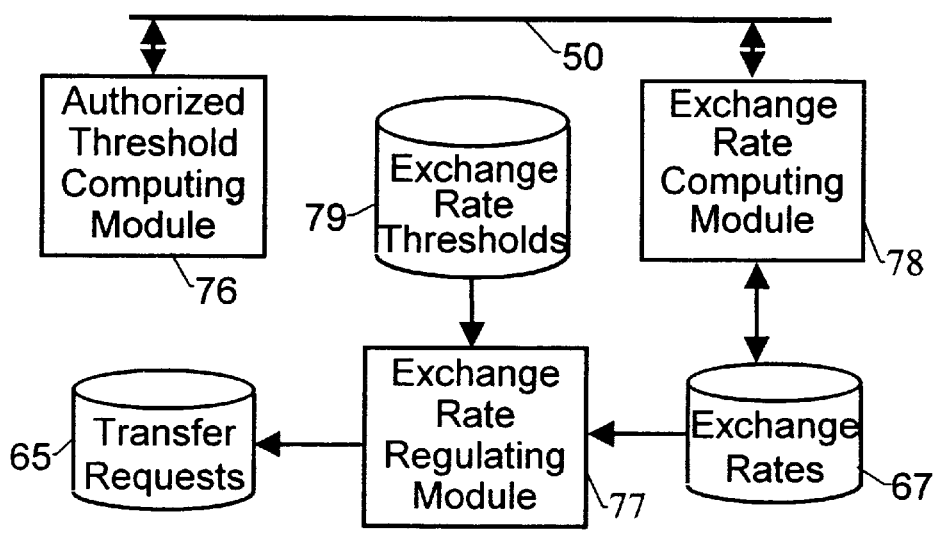
FIG. 5 illustrates, in the form of a block diagram, the particular processing performed by a peripheral control system represented in FIG. 2.

In FIG. 5, the computer 54 comprises, in addition to the elements shown in FIG. 4, a threshold computing module 76 which determines the thresholds to be applied by the transfer authorization module 57 of the computer 55, a module 77 for automatic regulation of exchange rates, and a module 78 for evaluating exchange rates which replaces the module 64 shown in FIG. 3.

The module 78 periodically updates the exchange rate values memorized in the file 67 and, upon each updating, transfers these values to the computers 51 to 53 via the network 50.

Module 78 can also be designed for continuously extrapolating the statistic indexes in order to permanently update the conversion rates of the local currencies into the reference currency and conversely.

The module 77 periodically reads the exchange rates memorized in the file 67 and compares them to respective upper and lower thresholds memorized in a file 79. If it detects that a local currency is depreciating too much by comparison with the other local currencies, it issues transfer requests to all banks B1 to B3 having amounts expressed in this currency, by entering these requests in the transfer requests file 65, the object of these requests being the transfer of a predetermined amount in the reference currency to be converted into the currency whose relative value is down. These requests are then processed as previously described, by the modules 62, 68 and 69 without there being any need to obtain an authorization from the computer 55 in the clearing center CC.

The computers 51 to 53 receiving these requests then avail of the amount transferred in the reference currency, and, in exchange, transfer the corresponding value in the local currency in question, to the central bank BC.

Conversely, if the module 77 detects that the value of a local currency is becoming too high in relation to the other local currencies, it issues transfer requests to all banks B1 to B3 having amounts expressed in the reference currency, to exchange them for the corresponding amounts in the currency in question.

In both cases, the debiting and crediting of amounts in local currency and reference currency are carried out on the bank's accounts 73. All these operations are, of course, recorded in the log file 66 of each computer 51 to 54, thus enabling any errors that might occur, especially network 50 transmission errors, to be corrected in the event of a problem.

What is claimed is:

1. A transfer system for transferring amounts expressed in different local currencies between a plurality of local banking organizations, each local banking organization using a respective local currency having a respective current value in terms of purchasing power varying randomly as a function of time, each local banking organization comprising at least one respective peripheral computer connected to a central computer by means of a transmission network, a peripheral computer of each of said local banking organizations comprising:

a first conversion means for determining a first conversion rate to convert a respective local currency used by said local banking organization into a new reference currency, said first conversion rate being determined so that said reference currency has a constant value in terms of purchasing power in a predetermined zone, a second conversion means for determining a second conversion rate to convert the reference currency into said local currency, said first and second conversion rates taking into account previous value variations of said local currency with respect to said reference currency, a first transfer means for transferring to another local banking organization an amount expressed in said local currency, said first transfer means comprising a means for triggering said first conversion means, a means for applying the first conversion rate thus determined by the first conversion means to the amount to be transferred so as to obtain an equivalent amount in said reference currency, and a means for transferring said equivalent amount along with the indication specifying said another local banking organization for which said amount is destined, from said peripheral computer to said central computer via said transmission network, and a second transfer means for transferring to said local banking organization an amount in reference currency, this means comprising a means for transferring said amount in reference currency from said central computer to said peripheral computer via said transmission network, a means for triggering said second conversion means and a means for applying the second conversion rate thus determined by said second conversion means to said amount in reference currency in order to obtain an equivalent amount in said local currency, said central computer comprising a means for receiving and storing amounts in reference currency transferred by said peripheral computers of said local banking organizations, and for transferring amounts expressed in reference currency to said peripheral computers.

2. A transfer system for transferring amounts expressed in different local currencies between a plurality of local banking organizations each local banking organization using a respective local currency having a respective current value in terms of purchasing power varying randomly, each local banking organization comprising at least one respective peripheral computer connected to a central computer by means of a transmission network, a peripheral computer of each of said local banking organizations comprising:

a first conversion means for determining a first conversion operation to convert a respective local currency used by said local banking organization into a predetermined reference currency having a constant value in terms of purchasing power in a predetermined zone, a second conversion means for determining a second conversion operation to convert the reference currency into said local currency, said first and second conversion operations taking into account previous value variations of said local currency, a first transfer means for transferring to another local banking organization an amount expressed in said local currency, said first transfer means comprising a means for triggering said first conversion means, a means for applying the first conversion operation thus determined by the first conversion means to the amount to be transferred so as to obtain an equivalent amount in said reference currency, and a means for transferring said equivalent amount along with the indication specifying said another local banking organization for which said amount is destined, from said peripheral computer to said central computer via said transmission network, and a second transfer means for transferring to said local banking organization an amount in reference currency, this means comprising a means for transferring said amount in reference currency from said central computer to said peripheral computer via said transmission network, a means for triggering said second conversion means and a means for applying the second conversion operation thus determined by said second conversion means to said amount in reference currency in order to obtain an equivalent amount in said local currency, said central computer comprising a means for receiving and storing amounts in reference currency transferred by said peripheral computers of said local banking organizations, and for transferring amounts expressed in reference currency to said peripheral computers, and a means for appraising for each unit of time said amounts in said reference currency according to an interest rate.

3. The system as claimed in claim 1, wherein the amounts converted into said reference currency are exchanged between the peripheral computers without being converted into the respective local currencies of the local banking organizations.

4. A transfer system for transferring amounts expressed in different local currencies between a plurality of local banking organizations using respective local currencies having respective current values in terms of purchasing power varying randomly as a function of time, each local banking organization comprising at least one respective peripheral computer connected to a central computer by means of a transmission network, a peripheral computer of each of said local banking organizations comprising:

a first conversion means for determining a first conversion rate to convert a respective local currency used by said local banking organization into a new reference currency, a second conversion means for determining a second conversion rate to convert the reference currency into said local currency, said first and second conversion rates being determined by taking into account previous value variations of said local currency so that said reference currency has a constant value in terms of purchasing power in a predetermined zone, a first transfer means for transferring to another local banking organization an amount expressed in said local currency, said first transfer means comprising a means for triggering said first conversion means, a means for applying the first conversion rate thus determined by the first conversion means to the amount to be transferred so as to obtain an equivalent amount in said reference currency, and a means for transferring said equivalent amount along with the indication specifying said another local banking organization for which said amount is destined, from said peripheral computer to said central computer via said transmission network, and a second transfer means for transferring to said local banking organization an amount in reference currency, this means comprising a means for transferring said amount in reference currency from said central computer to said peripheral computer via said transmission network, a means for triggering said second conversion means and a means for applying the second conversion rate thus determined by said second conversion means to said amount in reference currency in order to obtain an equivalent amount in said local currency, said central computer comprising a means for receiving and storing amounts in reference currency transferred by said peripheral computers of said local banking organizations, and for transferring amounts expressed in reference currency to said peripheral computers, one of said local currencies being chosen as base local currency for determining the reference currency, said first conversion rate to convert said base local currency into said reference currency being equal to an inflation index in said predetermined zone which uses said base local currency.

5. The system as claimed in claim 4, wherein said first conversion rate when involving a local currency other than said base local currency is equal to a rate of conversion of said local currency into said base local currency multiplied by said inflation index.

6. A transfer system for transferring amounts expressed in different local currencies between a plurality of local banking organizations, each local banking organization using a respective local currency having a respective current value in terms of purchasing power varying randomly, each local banking organization comprising at least one respective peripheral computer connected to a central computer by means of a transmission network, a peripheral computer of each of said local banking organizations comprising:

a first conversion means for determining a first conversion operation to convert a respective local currency used by said local banking organization into a predetermined reference currency having a constant value in terms of purchasing power in a predetermined zone, a second conversion means for determining a second conversion operation to convert the reference currency into said local currency, said first and second conversion operations taking into account previous value variations of said local currency, a first transfer means for transferring to another local banking organization an amount expressed in said local currency, said first transfer means comprising a means for triggering said first conversion means, a means for applying the first conversion operation thus determined by the first conversion means to the amount to be transferred so as to obtain an equivalent amount in said reference currency, and a means for transferring said equivalent amount along with the indication specifying said another local banking organization for which said amount is destined, from said peripheral computer to said central computer via said transmission network, and a second transfer means for transferring to said local banking organization an amount in reference currency, this means comprising a means for transferring said amount in reference currency from said central computer to said peripheral computer via said transmission network, a means for triggering said second conversion means and a means for applying the second conversion operation thus determined by said second conversion means to said amount in reference currency in order to obtain an equivalent amount in said local currency, said central computer comprising a means for receiving and storing amounts in reference currency transferred by said peripheral computers of said local banking organizations, and for transferring amounts expressed in reference currency to said peripheral computers, and a control and monitoring mechanism which only authorizes operations transferring amounts in reference currency if they do not entail at the level of each local banking organization a deficit or surplus of reference currency exceeding predetermined thresholds.

7. The system as claimed in claim 1, wherein the amounts expressed in reference currency are used exclusively for exchanges between said local banking organizations.

8. The system as claimed in claim 1, wherein said conversion rates vary as a function of amounts in local currencies respectively put into circulation by said local banking organizations, said peripheral computer of each local banking organization further comprising:

a means for triggering said first transfer means, with said local banking organization as destination, applied to a certain amount in a local currency used by said local banking organization, when the value of said local currency drops abnormally in relation to other local currencies, which has the effect of transferring said amount in said local currency from said peripheral computer of said local banking organization to said central computer, applying the first conversion rate thereto, and transferring in exchange the equivalent amount expressed in reference currency from the central computer to the peripheral computer of said local banking organization, and a means for triggering the second transfer means applied to a certain amount in reference currency with said local banking organization as destination, when the value of said local currency increases abnormally in relation to other local currencies, which has the effect of applying the second conversion rate to the amount expressed in reference currency, and of transferring in exchange the equivalent amount in said local currency from the central computer to the peripheral computer of said local banking organization.

9. A transfer method for transferring amounts expressed in different local currencies, between a plurality of local banking organizations, each local banking organization using a respective local currency having a respective value in terms of purchasing power varying randomly as a function of time, said method comprising the steps of:

determining a first conversion rate to convert a first local currency used by a first local banking organization into a new reference currency as a function of previous value variations of said first local currency so that said reference currency has a constant value in terms of purchasing power in a predetermined zone, applying the first conversion rate to an amount in said local currency to be transferred to a second local banking organization, so as to obtain an equivalent amount in the reference currency, transferring said equivalent amount in reference currency from said first local banking organization to a central banking organization, determining a second conversion rate to convert said reference currency having a constant value in terms of purchasing power in said predetermined zone into a second local currency used by said second local banking organization, as a function of previous value variations of said second local currency with respect to said reference currency, transferring said equivalent amount in said reference currency from said central banking organization to said second local banking organization, and applying said second conversion rate to said equivalent amount in said reference currency, so as to obtain an equivalent amount in said second local currency.

10. A transfer method for transferring amounts expressed in different local currencies, between a plurality of local banking organizations, each local banking organization using a respective local currency having a respective value in terms of purchasing power varying randomly as a function of time, said method comprising the steps of:

determining a first conversion operation to convert a first local currency used by a first local banking organization into a predetermined reference currency as a function of previous value variations of said first local currency so that said reference currency has a constant value in terms of purchasing power in a predetermined zone, applying the first conversion operation to an amount in said local currency to be transferred to a second local banking organization, so as to obtain an equivalent amount in the reference currency, transferring said equivalent amount in reference currency from said first local banking organization to a central banking organization, determining a second conversion operation to convert said reference currency into a second local currency used by said second local banking organization, as a function of previous value variations of said second local currency, transferring said equivalent amount in said reference currency from said central banking organization to said second local banking organization, applying said second conversion operation to said equivalent amount in said reference currency, so as to obtain an equivalent amount in said second local currency, and appraising the amounts converted into said reference currency for each unit of time according to an interest rate.

11. The transfer method as claimed in claim 9, wherein the amounts converted into said reference currency are exchanged between said banking organizations without being converted into the respective local currencies of the local banking organizations.

12. A transfer method for transferring amounts expressed in different local currencies, between a plurality of local banking organizations, each local banking organization using a respective local currency having a respective value in terms of purchasing power varying randomly as a function of time, said method comprising the steps of:

determining a first conversion rate to convert a first local currency used by a first local banking organization into a new reference currency as a function of previous value variations of said first local currency, so that said reference currency has a constant value in terms of purchasing power in a predetermined zone, applying the first conversion rate to an amount in said local currency to be transferred to a second local banking organization so as to obtain an equivalent amount in the reference currency, transferring said equivalent amount in reference currency from said first local banking organization to a central banking organization, determining a second conversion rate to convert said reference currency into a second local currency used by said second local banking organization, as a function of previous value variations of said second local currency, transferring said equivalent amount in said reference currency from said central banking organization to said second local banking organization, applying said second conversion rate to said equivalent amount in said reference currency, so as to obtain an equivalent amount in said second local currency, and one of said first and second local currencies being chosen as base local currency for determining the reference currency, the conversion rate for converting said base local currency into said reference currency being equal to an index of inflation in said predetermined zone which uses said base local currency.

13. The transfer method as claimed in claim 12, wherein said first conversion rate when involving a local currency other than said base local currency is equal to a rate of conversion of said local currency into said base local currency multiplied by said inflation index.

14. The transfer method as claimed in claim 9, wherein said central banking organization only authorizes operations transferring amounts in reference currency if they do not entail at the level of each local banking organization a deficit or surplus of reference currency exceeding predetermined thresholds.

15. The transfer method as claimed in claim 9, wherein the amounts expressed in reference currency are used exclusively for exchanges between said local banking organizations.

16. A method for regulating monetary exchange rates of a plurality of local currencies used by respective local banking organizations, each local currency having a respective value in terms of purchasing power varying as a function of the amounts in local currencies respectively put into circulation by said local banking organizations, said method comprising the steps of:

when the value of a local currency used by a local banking organization drops abnormally in relation to other local currencies, determining a first conversion rate as a function of previous value variations of said local currency to convert said local currency into a new reference currency, said first conversion rate being determined so that said reference currency has a constant value in terms of purchasing power in a predetermined zone, said reference currency being exclusively used for exchanges between local banking organizations, applying the first conversion rate to an amount in said local currency, so as to obtain an equivalent amount in the reference currency, transferring said amount in said local currency from said local banking organization to said a central banking organization, and transferring in exchange said equivalent amount in reference currency from said central banking organization to said local banking organization, and when the value of said local currency increases abnormally in relation to other local currencies, determining a second conversion rate as a function of previous value variations of said local currency to convert said reference currency into said local currency, said second conversion rate being determined so that said reference currency has a constant value in terms of purchasing power in said predetermined zone, applying said second conversion rate to an amount in said reference currency, so as to obtain an equivalent amount in said local currency, transferring said amount in said reference currency from said local banking organization to said central banking organization, and transferring in exchange the equivalent amount in said local currency from said central banking organization to said local banking organization.

17. The transfer method as claimed in claim 12, wherein said inflation index is a daily inflation index computed by extrapolation by means of the following formula:

$$Id=Id_m+j\times Id_j$$

$Id_m$ being a last known inflation index, j being a number of days lapsed since an end of a period of evaluation of said inflation index $Id_m$, and $Id_j$ being a daily growth rate of said inflation index $Id_m$.

* * * * *